United States Patent Office 3,476,823
Patented Nov. 4, 1969

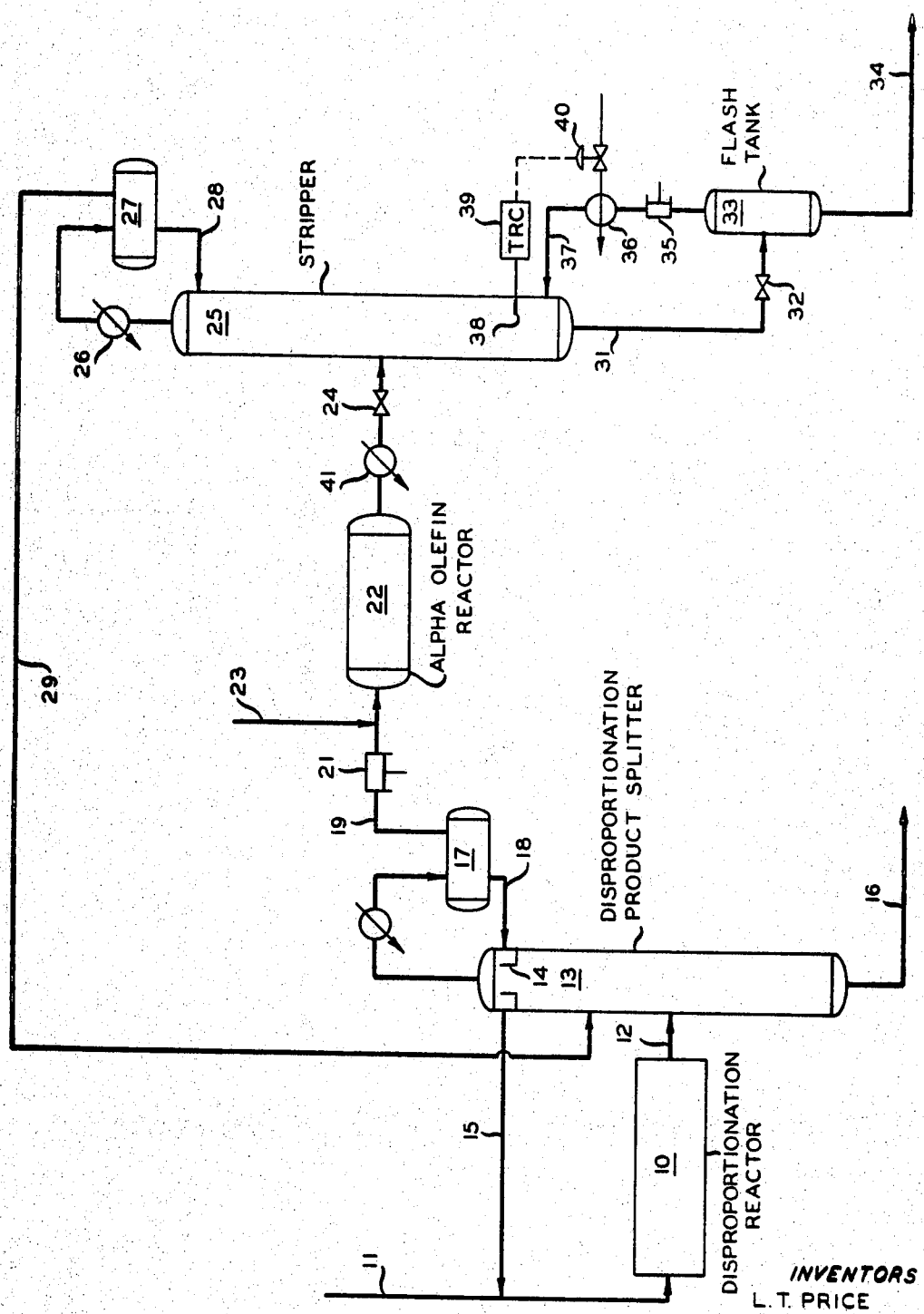

3,476,823
SEPARATION OF PRODUCTS OF ETHYLENE POLYMERIZATION
Lowell T. Price, Bartlesville, Okla., John J. Moon, Antwerp, Belgium, and Charles M. Stewart, Bartlesville, Okla., assignors to Phillips Petroleum Company, a corporation of Delaware
Filed Feb. 3, 1966, Ser. No. 524,709
Int. Cl. B01d 3/06; C07c 3/10
U.S. Cl. 260—683.15                    5 Claims

ABSTRACT OF THE DISCLOSURE

A stream containing ethylene, butylenes, higher olefins and aluminum alkyls is separated by low temperature distillation with the bottoms liquid from the distillation zone being flashed and the flashed vapor compressed and returned to the distillation zone as stripping vapor. The process is applicable to the separation of an ethylene polymerization effluent.

---

This invention relates to hydrocarbon conversion. In one aspect the invention relates to a method for recovery of product in a hydrocarbon conversion process. In another aspect the invention relates to an improvement in the recovery of product in the one-step polymerization of alpha olefins to produce higher boiling alpha olefins wherein the polymerization reaction is catalyzed by triethyl aluminum.

Alpha olefins are polymerized to produce higher molecular weight alpha olefins by contacting an olefin with an aluminum alkyl such as aluminum triethyl at suitable operating conditions. When the lower molecular weight olefin is ethylene, a straight chain alpha olefin is produced. The polymerization reaction can be conducted continuously by maintaining suitable conditions including the proper mol ratio of olefin to aluminum alkyl and conditions of temperature, pressure, etc., such that the higher boiling olefins are produced.

It has also recently been discovered that the alpha olefin polymerization process can advantageously be integrated with a propylene disproportionation process thereby to utilize as feed in the polymerization process the ethylene that is produced in the disproportionation process. In this specification disproportionation is defined as the conversion of a hydrocarbon into similar hydrocarbons of higher and lower numbered carbon atoms per molecule. By employing the technique of disproportionation a relatively plentiful hydrocarbon can be converted to a relatively less plentiful hydrocarbon. In some hydrocarbon conversion processes propylene is produced as a by-product and the demand for propylene may be quite low whereas there could be a higher demand for hydrocarbons such as ethylene and butene. When propylene is disproportionated, approximately equimolar quantities of ethylene and butene are produced. Disproportionation can be accomplished using any catalyst known to be suitable for the reaction. Such catalyst can comprise a mixture of molybdenum oxide and aluminum oxide; a mixture of tungsten oxide and silica; molybdenum and tungsten hexacarbonyl and alumina, and other catalysts known to catalyze the disproportionation reaction. Details of some suitable disproportionation processes are given in copending applications: Ser. No. 307,371, Heckelsberg, filed Sept. 9, 1963, and now abandoned; Ser. No. 312,209, Banks, filed Sept. 27, 1963, now Patent No. 3,261,879; Ser. No. 336,624, Heckelsberg, filed Jan. 9, 1964, now Patent No. 3,340,322; and Ser. No. 94,996, Banks, filed Mar. 13, 1961. In the production of high molecular weight, straight-chain alpha olefins in a single step process catalyzed by an aluminum alkyl, it has been found necessary to separate butenes and lighter from the high molecular weight product; however, the reactor effluent must be maintained at a relatively low temperature in order to prevent continued reaction of the reactants present to the detriment of the product in that branch-chain hydrocarbons are produced at temperatures usually encountered in making such separations.

We have discovered that in the separation of polymerization reactor effluent products the temperature and pressure of the effluent stream can be reduced to values where further reaction of the reactants is substantially eliminated by separating the reaction effluent products in a stripping step wherein the kettle product from the stripper is flashed to a pressure and a temperature such that substantially all of the $C_4$ and lighter hydrocarbons are vaporized. The flashed vapors are then recompressed and introduced into the bottom of the stripper as the stripping medium whereby the presence of these lighter materials in the stripper bottom permits satisfactory stripping at a temperature sufficiently low that continued reaction of the reactants is substantially eliminated.

It is an object of my invention to provide a method and a means for recovery of hydrocarbons in a hydrocarbon conversion process. It is also an object of my invention to provide a method and means for separating reactants in a polymerization process effluent at temperatures wherein the reactants in the effluent are not reactive. A further object of my invention is to provide a method and means for removing butene and lighter hydrocarbons from the effluent of an alpha olefin polymerization process utilizing an aluminum alkyl catalyst at a temperature sufficiently low that reaction of the reactants is substantially eliminated. A further object of my invention is to provide a method and means for recovering ethylene present in the reactor effluent of an alpha olefin polymerization process utilizing an aluminum alkyl catalyst and utilizing the ethylene so recovered in the ethylene recovery step. Further objects and advantages of the invention will be apparent to one skilled in the art upon studying the present disclosure including the detailed description of the invention and the appended drawing wherein:

The single figure is a schematic flow diagram of a preferred embodiment of the invention.

In the drawing propylene is introduced into disproportionation reactor 10 via conduit 11. Reactor 10 can contain a suitable quantity of a disproportionation catalyst such as molybdenum oxide and aluminum oxide. Reaction effluent is passed via conduit 12 to fractionator 13 which can be a conventional distillation column with liquid sidedraw facilities such as collector tray 14 for collection and removal of liquid propylene. The recovered propylene is recycled via conduit 15 to conduit 11. Butene, produced in the reactor 10, is removed via conduit 16 as product.

Overhead vapors from column 13 are cooled to condense compounds heavier than ethylene. Condensate in accumulator 17 is returned via conduit 18 to column as reflux. Ethylene is passed via conduit 19 and compressor 21 to polymerization reactor 22 along with an alpha olefin polymerization catalyst such as triethyl aluminum introduced via conduit 23. Alpha olefins are produced in reactor 22 by polymerization of ethylene under the influence of the aluminum alkyl. Operating conditions in reactor 22 can be, for example, pressure=about 7000 p.s.i.a.; temperature=about 455° F.; residence time=about 20 minutes; and ethylene to triethyl aluminum weight ratio=about 1000:1.

Reactor 22 is cooled in cooler 41 and flashed through valve 24 into stripper 25. Stripper 25 is operated at a pressure of 600 p.s.i.a. with a maximum temperature of about 200° F. The stripper bottom temperature will be about 200° F. and the stripper top temperature will be about 120° F. The overhead vapors from the stripper comprising ethylene and butene are cooled in cooler 26 to about 60° F. Condensate collected in accumulator 27 is returned to stripper 25 via conduit 28 as reflux. Vapors from accumulator 27 are passed via conduit 29 to fractionator 13.

The bottoms product of stripper 25 is passed via conduit 31 and valve 32 to flash tank 33 maintained at a pressure of about 150 p.s.i.a. and a temperature of about 175° F. Liquid product is removed from flash tank 33 via conduit 34 for final processing such as hydrolysis to destroy the triethyl aluminum catalyst and fractionation steps as required or desired.

The vapors removed from flash tank 33 are compressed in compressor 35, cooled, if necessary, in cooler 36 and returned to the bottom of stripper 25 via conduit 37.

The temperature in the bottom of stripper 25 is sensed by temperature sensing element 38 which can be a thermocouple and a signal representative of the stripper bottom temperature is passed to temperature recording controller 39 which, in turn, is operatively connected to valve 40 so as to pass coolant to cooler 36 as required to maintain the temperature in stripper 25 at a maximum of about 200° F.

In the process described in connection with the drawing the polymerization reactor effluent contains a considerable amount of butene-1 and ethylene. For example, these combined streams may comprise about 40 percent of the reactor effluent. The butene-1 is oftentimes not a desirable component of the polymerization reaction, for example, if the polymerization reaction product is to be used in the manufacture of detergent grade alkylates, and therefore butene-1 is often removed along with the ethylene in the distillation step. The polymerization reactor effluent will also contain an appreciable amount of aluminum alkyl catalyst and therefore it is necessary to maintain the temperature in the distillation step no higher than about 200° F. in order to prevent the polymerization reaction continuing under conditions which could cause formation of undesirable branched-chain olefins.

The process of this invention provides a source of ethylene for addition to the liquid in the bottom of the distillation column to lower the bubble point of the liquid in the column to a safe temperature at the desired pressure. The ethylene, along with some other olefins such as butene and a small amount of hexene, recovered as a vapor from the flash zone, is compressed to a high enough pressure to re-enter the column. The heat of compression of the vapor is sufficient to provide the necessary heat for reboiling the liquid in the distillation column. Thus the process of the present invention serves not only to recover ethylene for recycle to the polymerization process but also provides heat to reboil the column and a flow of ethylene vapor through the column which acts as a stripping gas. This method allows a very high percentage recovery of ethylene at high purity and fairly high pressure using cooling water instead of more expensive refrigerants.

Since it is necessary to maintain the temperature in the bottom of the distillation column below that which would result in a continuation of the polymerization reaction, a cooler, for example a water cooler, is included in the conduit carrying the compressed vapors into the bottom of the distillation column. A temperature sensing element in the bottom of the distillation column transmits a signal to a conventional temperature recording controller which, in turn, operates a valve in the stream of coolant passing to the cooler so that the compressed vapors can be cooled if necessary prior to entry into the distillation column.

The present invention recovers ethylene at a purity of greater than 95 weight percent for recycle to the polymerization which otherwise would be lost.

That which is claimed is:

1. A process for removing ethylene and butene from a mixture containing ethylene, butene, higher boiling olefins and aluminum alkyl catalyst in a distillation step comprising:

passing said mixture into a distillation zone;

removing ethylene and butene overhead as vapor;

removing liquid from the bottom of said distillation zone, said liquid comprising butene, higher boiling olefins and aluminum alkyl catalysts;

flashing said liquid into a flash zone to a lower pressure such that substantially all of the butene contained therein is vaporized;

removing butene from said flash zone and compressing same;

passing the compressed butene into the lower portion of said distillation zone to strip the liquid contained therein; and removing higher boiling olefins and aluminum alkyl substantially free from butene from said flash zone.

2. The process of claim 1 wherein said mixture comprises the effluent from a reactor in which ethylene is polymerized in a polymerization zone to produce higher molecular weight alpha olefins by contact with an aluminum alkyl and the effluent of said polymerization zone is cooled and flashed into said distillation zone.

3. The process of claim 2 wherein the effluent from the ethylene polymerization process is flashed into the distillation zone to a pressure of about 600 p.s.i.a.; the kettle product from the distillation zone is flashed to a pressure of about 150 p.s.i.a. in the flash zone; and the vapors from the flash zone are introduced into the bottom of the distillation zone at a temperature sufficient to maintain the liquid in the bottom of the distillation zone at a temperature of about 200° F.

4. The process of claim 3 wherein the compressed vapors introduced into the bottom of the distillation zone provide the sole source of heat for reboiling the liquid in the bottom of the distillation zone.

5. The process of claim 2 wherein the ethylene polymerization process is operated in combination with a propylene disproportionation process such that the ethylene produced in the disproportionation process provides the feed to the polymerization process;

the butene removed from the distillation zone is added to the disproportionation product butene; and the ethylene removed from the distillation zone is returned to the feed to the polymerization process.

References Cited

UNITED STATES PATENTS

| | | | |
|---|---|---|---|
| 2,159,899 | 5/1939 | Kranz | 203—78 |
| 2,327,643 | 8/1943 | Houghland | 203—26 X |
| 2,619,814 | 12/1952 | Kneil | 203—26 X |
| 2,699,457 | 1/1955 | Ziegler et al. | |
| 2,912,365 | 11/1959 | Irvine | 203—26 X |
| 3,330,822 | 7/1967 | Albright | 260—683.15 |

PAUL M. COUGHLAN, Jr., Primary Examiner

U.S. Cl. X.R.

203—26, 78, 88; 260—683